US012240227B2

(12) United States Patent
Sanada

(10) Patent No.: US 12,240,227 B2
(45) Date of Patent: Mar. 4, 2025

(54) REGULATION DEVICE AND PRINTER

(71) Applicant: TOSHIBA TEC KABUSHIKI KAISHA, Tokyo (JP)

(72) Inventor: Tsuyoshi Sanada, Susono Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 207 days.

(21) Appl. No.: 18/174,669

(22) Filed: Feb. 27, 2023

(65) Prior Publication Data

US 2024/0286418 A1 Aug. 29, 2024

(51) Int. Cl.
*B41J 11/00* (2006.01)

(52) U.S. Cl.
CPC .................................. *B41J 11/0045* (2013.01)

(58) Field of Classification Search
CPC .................................................... B41J 11/0045
See application file for complete search history.

(56) References Cited

U.S. PATENT DOCUMENTS

2002/0175985 A1* 11/2002 Zevin .................. B65H 75/241 347/104
2008/0224388 A1* 9/2008 Kim ....................... B65H 1/266 271/236
2008/0239034 A1* 10/2008 Umeda ................ B41J 2/17513 347/86
2013/0049290 A1 2/2013 Matsumoto

FOREIGN PATENT DOCUMENTS

JP 2016130161 A * 7/2016

* cited by examiner

*Primary Examiner* — Jason S Uhlenhake
(74) *Attorney, Agent, or Firm* — Amin, Turocy & Watson, LLP

(57) ABSTRACT

A regulation device regulates movement in a width direction of a rolled sheet which is a recording medium of a printer. The regulation device includes: a first rack gear connected to one guide support unit supporting the rolled sheet so that movement to one side of the width direction is regulated, and provided to be movable in the width direction; a second rack gear connected to the other guide support unit supporting the rolled sheet so that movement to the other side of the width direction is regulated, and provided to be movable in the width direction; a pinion gear engaging with the first and second rack gears; and a regulation gear that engages with the pinion gear to rotate and regulates the movement of the first and second rack gears by regulating the rotation.

20 Claims, 12 Drawing Sheets

REGULATION DEVICE AND PRINTER

FIELD

Embodiments described herein relate generally to a technology for regulating movement of a recording medium of a printer.

BACKGROUND

In the related art, a rolled sheet in which a long sheet is wound around the outer circumference of a core formed in a substantially cylindrical shape is used as a recording medium of a printer. The printer using the rolled sheet includes two guide support units provided to be movable in a width direction of the rolled sheet. The core of the rolled sheet is supported by the two guide support units so that movement in the width direction is regulated. The two guide support units are configured to move in the width direction in conjunction with each other. Accordingly, the rolled sheet is set in the printer so that a substantially middle portion of the rolled sheet in the width direction is located at a position in a predetermined width of the printer.

If the rolled sheet is set in the printer, a user first moves the two guide support units to be separated from each other, and mounts the rolled sheet between the two guide support units. Thereafter, the user moves the two guide support units to be close to each other in accordance with the width of the rolled sheet.

DETAILED DESCRIPTION

Figure 1:
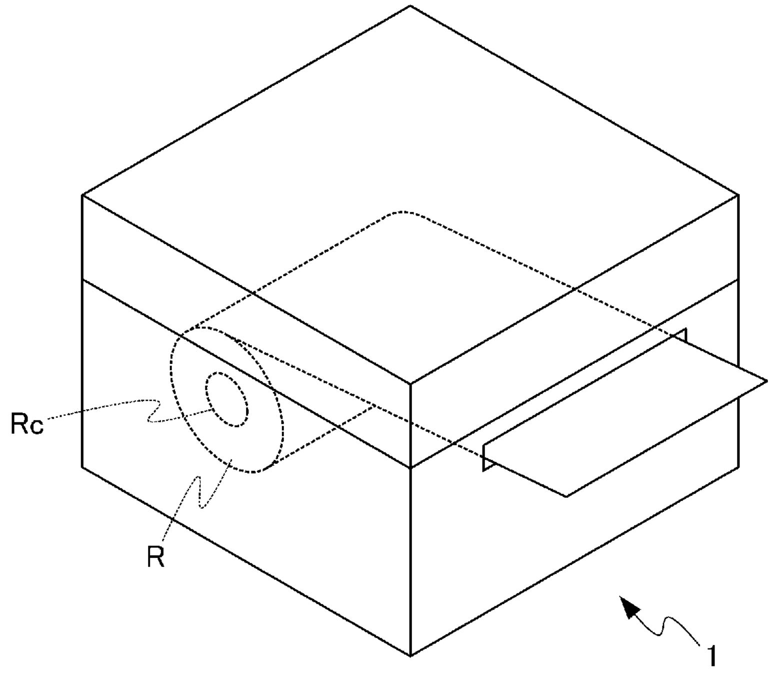
FIG. 1 is a schematic perspective view illustrating a configuration of a printer according to a first embodiment.

An aspect of an exemplary embodiment provides a technology capable of setting a rolled sheet in a printer more easily.

In general, according to one embodiment, a regulation device regulates movement in a width direction of a rolled sheet which is a recording medium of a printer. The regulation device includes: a first rack gear connected to one guide support unit supporting the rolled sheet so that movement to one side of the width direction is regulated, and provided to be movable in the width direction; a second rack gear connected to the other guide support unit supporting the rolled sheet so that movement to the other side of the width direction is regulated, and provided to be movable in the width direction; a pinion gear engaging with the first and second rack gears; and a regulation gear that engages with the pinion gear to rotate and regulates movement of the first and second rack gears by regulating the rotation.

Hereinafter, embodiments will be described with reference to the drawings. In each drawing, the same reference numerals are given to the same configurations.

First Embodiment

Configuration of Printer and Guide Device

Figure 2:
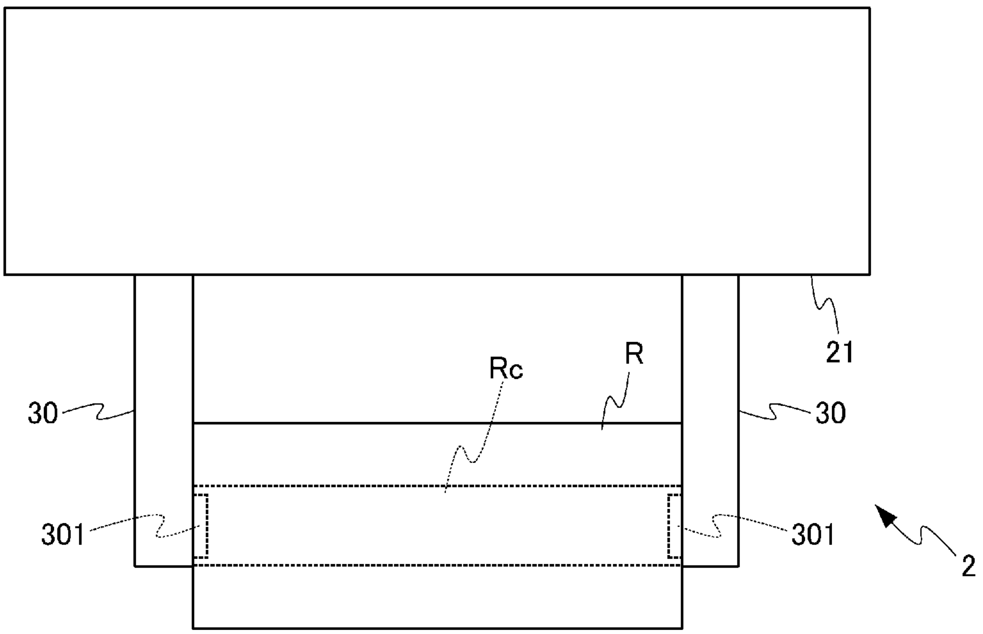
FIG. 2 is a schematic plan view illustrating a configuration of a guide device.

Configurations of a printer and a guide device according to a first embodiment will be described. FIG. 1 is a schematic perspective view illustrating the configuration of the printer according to the present embodiment. FIG. 2 is a schematic plan view illustrating the configuration of the guide device according to the present embodiment.

As illustrated in FIG. 1, a printer 1 is an apparatus that forms an image on a rolled sheet R which is a recording medium. The printer 1 defines an accommodation space where the rolled sheet R can be accommodated inside and is configured to be openable and closable so that the rolled sheet R can be set in the accommodation space from the outside. The rolled sheet R is a long printing sheet wound around a core Rc formed in a substantially cylindrical shape. The printer 1 forms an image on the rolled sheet R and ejects the image to the outside while winding and unwinding the rolled sheet R.

As illustrated in FIG. 2, a guide device 2 includes a regulation device 21 and two guide support units 30 and rotatably supports the rolled sheet R while regulating movement in a width direction of the rolled sheet R. Each of the two guide support units 30 is a long substantial plate member extending in one direction and a support portion 301 is provided on one surface side at one end. The support portion 301 is formed in a substantially discoid shape which can be inserted into the core Rc. In the two guide support units 30, the other ends are connected to the regulation device 21 so that the support portions 301 face each other.

The regulation device 21 supports the two guide support units 30 so that the guide support units 30 can move only in an orthogonal direction orthogonal to extension directions of the guide support units 30 and regulates movement of the two guide support units 30 inward in the orthogonal direction in accordance with a set width set by a user, as will be described in detail below.

Configuration of Regulation Device

Figure 3:
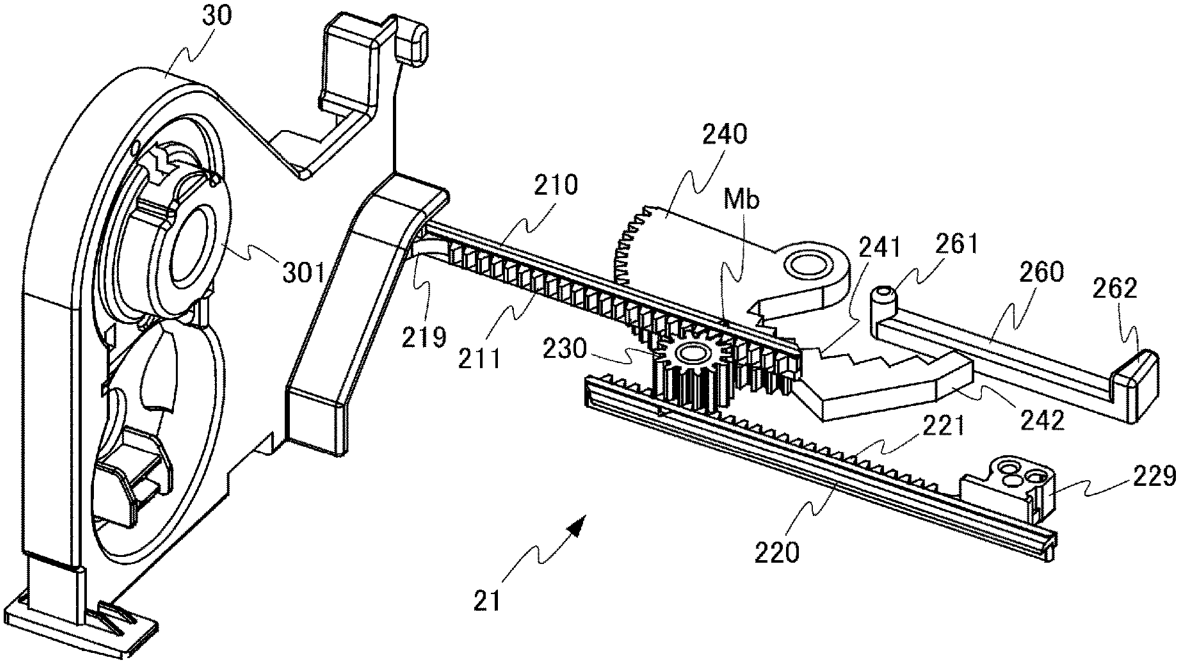
FIG. 3 is a perspective view illustrating a configuration of a regulation device.
Figure 4:
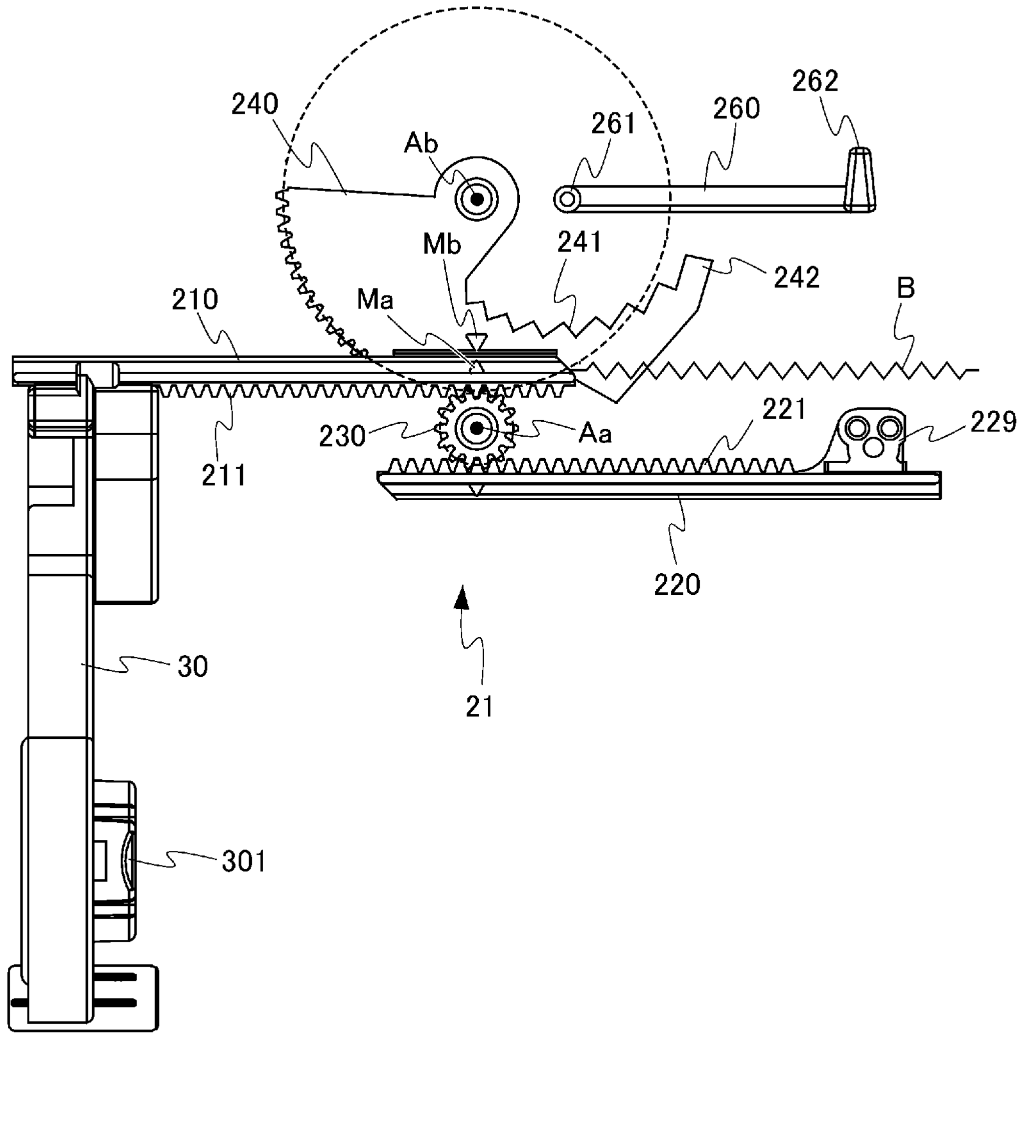
FIG. 4 is a plan view illustrating the configuration of the regulation device.
Figure 5:
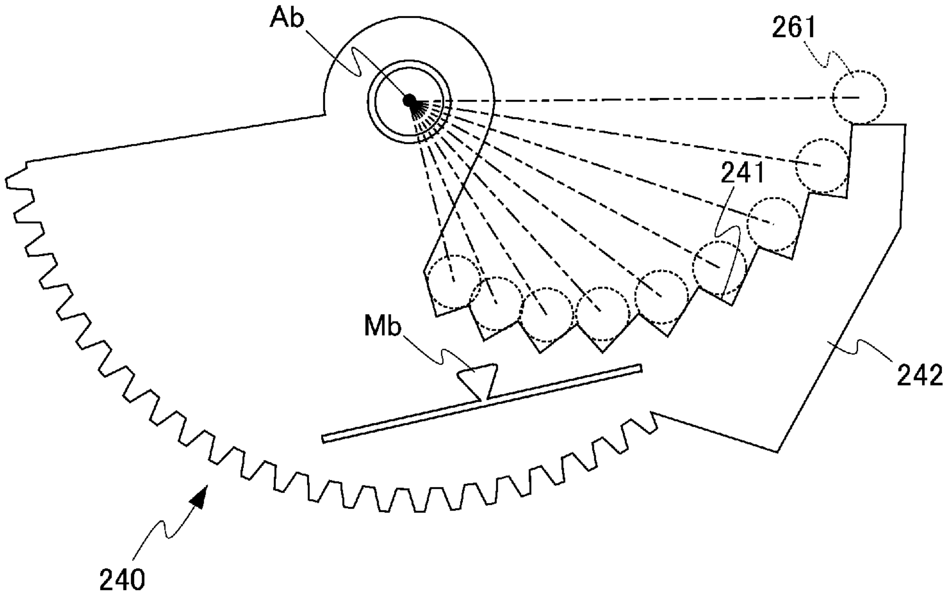
FIG. 5 is a plan view illustrating a configuration of a regulation gear.

A configuration of a regulation device according to the first embodiment will be described. FIGS. 3 and 4 are a perspective view and a plan view illustrating the configuration of the regulation device according to the present embodiment. FIG. 5 is a plan view illustrating a configuration of a regulation gear. In FIGS. 3 and 4, only one guide support unit connected to a first rack gear is illustrated.

As illustrated in FIGS. 3 and 4, the regulation device 21 includes a first rack gear 210, a second rack gear 220, a pinion gear 230, a regulation gear 240, and a rotation regulation portion 260.

The first rack gear 210 is formed in a substantial plate shape on the whole and includes a gear portion 211 and a connection portion 219. The gear portion 211 is formed on one surface of the first rack gear 210 and includes a plurality of teeth juxtaposed in an extension direction of the first rack gear 210. The connection portion 219 is formed at one end of the first rack gear 210 and connected to an end on a side on which a support portion 301 of one guide support unit 30 is not provided. The one guide support unit 30 is connected to the connection portion 219 so that the extension direction of the one guide support unit 30 is orthogonal to the extension direction of the first rack gear 210 and the support portion 301 faces the other end side of the first rack gear 210.

The second rack gear 220 is formed in a substantial plate shape on the whole and includes a gear portion 221 and a connection portion 229. The gear portion 221 is formed on one surface of the second rack gear 220 and includes a plurality of teeth juxtaposed in an extension direction of the second rack gear 220. The connection portion 229 is formed at one end of the second rack gear 220 and connected to an end on a side on which a support portion 301 of the other guide support unit 30 is not provided. The other guide support unit 30 is connected to the connection portion 229 so that the extension direction of the other guide support unit 30 is orthogonal to the extension direction of the second rack gear 220 and the support portion 301 faces the other end side of the second rack gear 220.

The pinion gear 230 is a circular gear rotating about a rotation shaft Aa and engages with the gear portion 211 of the first rack gear 210, the gear portion 221 of the second rack gear 220, and the regulation gear 240.

The first rack gear 210 and the second rack gear 220 are disposed so that the extension directions of the first rack gear 210 and the second rack gear 220 are orthogonal to an axial direction of the rotation shaft Aa. The first rack gear 210 and the second rack gear 220 are disposed so that the gear portion 211 and the gear portion 221 face each other in a direction orthogonal to the extension directions of the first rack gear 210 and the second rack gear 220 and the axial direction of the rotation shaft Aa.

In the following description, the extension directions of the first rack gear 210 and the second rack gear 220 are referred to as a horizontal direction, the axial direction of the rotation shaft Aa is referred to as a vertical direction, and a direction orthogonal to the horizontal direction and the vertical direction is referred to as an anteroposterior direction. In the present embodiment, two guide support units 30 are connected to the first rack gear 210 and the second rack gear 220 so that the extension directions of the guide support units 30 are oriented in the anteroposterior direction (a direction oriented vertically in FIG. 4).

The first rack gear 210 and the second rack gear 220 are disposed so that the connection portions 219 and 229 are located outward in the horizontal direction, respectively. In the first rack gear 210, an urging member B (see FIG. 4) is connected to an end on the side opposite to the end at which the connection portion 219 is provided. The urging member B is a member that urges the first rack gear 210 inward in the horizontal direction and is configured as a tension coil spring in the present embodiment.

As illustrated in FIG. 4, the regulation gear 240 is a variant circular gear that rotates about a rotation shaft Ab of which an axial direction is oriented in the same direction as the rotation shaft Aa, that is, the vertical direction, and is formed in a substantial fan shape that has an arc forming a part of the circumference of a circle centered on the rotation shaft Ab. A plurality of teeth engaging with the pinion gear 230 are formed in the arc of the regulation gear 240. The regulation gear 240 is provided so that the vicinity of the arc engaging with the pinion gear 230 overlaps the first rack gear 210 in the vertical direction. The regulation gear 240 is located below the first rack gear 210 in the present embodiment.

In the regulation gear 240, a locked portion 241 in which a plurality of steps are formed and a protrusion portion 242 that protrudes to a diameter outside of a pitch circle of the regulation gear 240 are formed. The locked portion 241 is formed from the inside of the pitch circle to the protrusion portion 242 located outside of the pitch circle. Each of the plurality of steps of the locked portion 241 has a surface intersecting in a rotation direction of the regulation gear 240. The plurality of steps are formed along a curved line forming a part of a spiral centered on the rotation shaft Ab, as will be described in detail below.

The rotation regulation portion 260 is a long member in which a locking portion 261 is formed at one end and a manipulation portion 262 is formed at the other end. The rotation regulation portion 260 is provided so that the locking portion 261 can move in a direction orthogonal to the rotation direction of the regulation gear 240 and the axial direction of the rotation shaft Ab and, preferably, in a radial direction of the pitch circle of the regulation gear 240. The locking portion 261 moves so that the locking portion 261 enters a range in which the locking portion 261 comes into contact with the locked portion 241 if the regulation gear 240 is rotated to the side on which the locked portion 241 is formed (a counterclockwise direction in FIG. 4).

The manipulation portion 262 is provided to be exposed to the outside of the printer 1 and to be able to be held by the user. In the printer 1, an indicator indicating a plurality of widths of the rolled sheet R is provided and the plurality of widths are juxtaposed in the movement direction of the rotation regulation portion 260. The indicator is provided in the printer 1 so that the manipulation portion 262 indicates the plurality of widths. The user moves the rotation regulation portion 260 through the manipulation portion 262 in accordance with the width of the rolled sheet R set in the printer 1. In the rotation regulation portion 260, a latch mechanism (not illustrated) that regulates movement of the rotation regulation portion 260 is provided. The user releases regulation by the latch mechanism through the manipulation portion 262 if the rotation regulation portion 260 is moved. Display positions of the plurality of widths included in the indicator are set to match a distance between the two guide support units 30.

In each of the first rack gear 210 and the regulation gear 240, markers Ma and Mb are engraved, respectively. A worker who manufactures the regulation device 21 assembles the regulation gear 240 to the first rack gear 210 so that the marker MA of the first rack gear 210 matches the marker Mb of the regulation gear 240. Accordingly, it is possible to reduce variation in regulation positions of the two guide support units 30 for each regulation device 21.

Operation of Regulation Device

Figure 6:
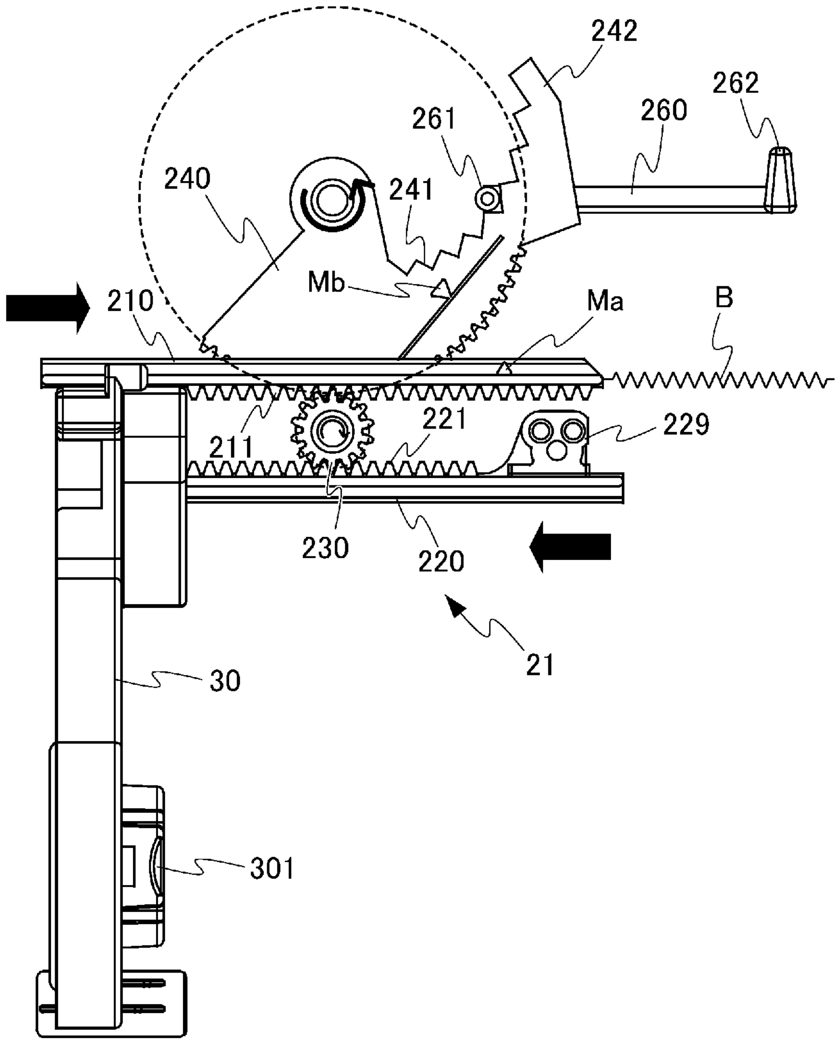
FIG. 6 is a plan view illustrating an operation of the regulation device.
Figure 7:
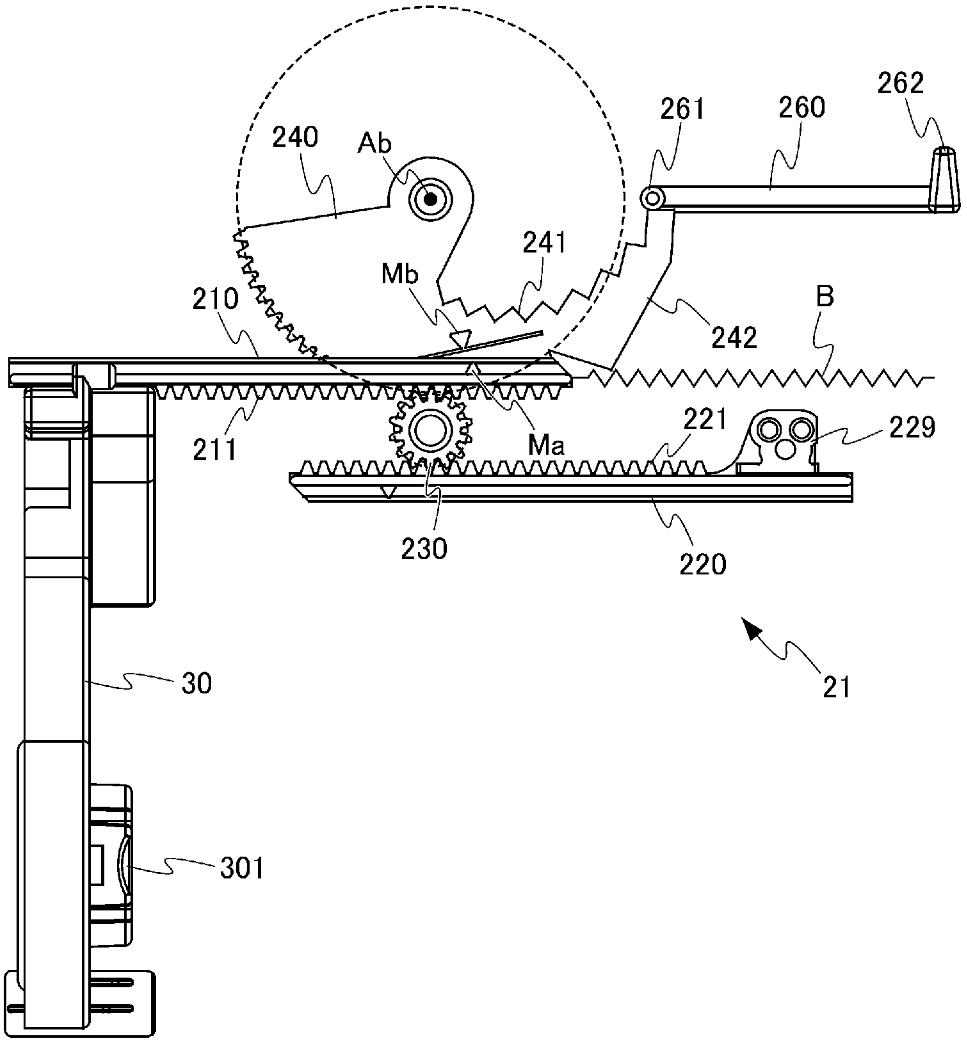
FIG. 7 is a plan view illustrating the regulation device that performs regulation with a maximum width.
Figure 8:
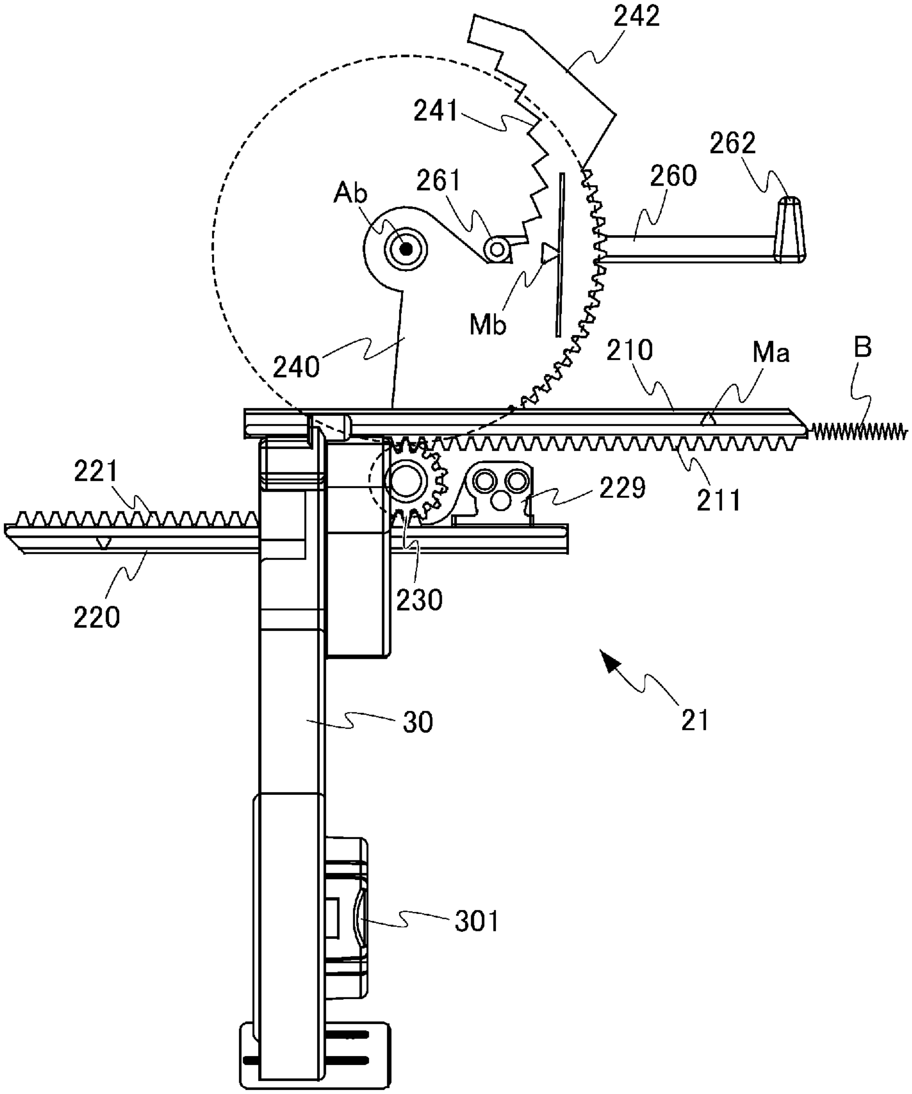
FIG. 8 is a plan view illustrating the regulation device that performs regulation with a minimum width.

An operation of the regulation device according to the first embodiment will be described. FIG. 6 is a plan view illustrating the operation of the regulation device according to the present embodiment. FIGS. 7 and 8 are plan views illustrating the regulation device that performs regulation with a maximum width and a minimum width.

As illustrated in FIG. 6, if the first rack gear 210 is urged inward (the right in FIG. 6) in the horizontal direction by the urging member B, the pinion gear 230 engaging with the gear portion 211 of the first rack gear 210 is rotated clockwise in FIG. 6. At this time, the second rack gear 220 of which the gear portion 221 engages with the pinion gear 230 is moved inward (the left in FIG. 6) in the horizontal direction.

If the pinion gear 230 is rotated clockwise, the regulation gear 240 engaging with the pinion gear 230 is rotated counterclockwise in FIG. 6. If the regulation gear 240 is rotated counterclockwise, the locked portion 241 of the regulation gear 240 comes into contact with the locking portion 261 of the rotation regulation portion 260 to further regulate rotation.

If the counterclockwise rotation of the rotation regulation portion 260 is regulated, rotation of the pinion gear 230 engaging with the regulation gear 240 is regulated. If the rotation of the pinion gear 230 is regulated, inward movement of the first rack gear 210 and the second rack gear 220 engaging with the pinion gear 230 in the horizontal direction is further regulated.

In this way, if the rotation regulation portion 260 regulates the rotation of the regulation gear 240, inward movement of the first rack gear 210 and the second rack gear 220 interlocking each other in the horizontal direction is regulated.

As illustrated in FIG. 7, if the locking portion 261 of the rotation regulation portion 260 locks the step of the locked portion 241 farthest away from the rotation shaft Ab, a rotatable range of the rotation regulation portion 260 in the counterclockwise direction decreases. Accordingly, as the locking portion 261 is farther away from the rotation shaft Ab, the connection portion 219 of the first rack gear 210 is farther away from the connection portion 229 of the second rack gear 220.

On the other hand, as illustrated in FIG. 8, if the locking portion 261 of the rotation regulation portion 260 locks the step of the locked portion 241 closest to the rotation shaft Ab, a rotatable range of the rotation regulation portion 260 in the counterclockwise direction increases. Accordingly, as the locking portion 261 is closer to the rotation shaft Ab, the connection portion 219 of the first rack gear 210 is closer to the connection portion 229 of the second rack gear 220.

According to the regulation device 21 according to the present embodiment, the first rack gear 210 and the second rack gear 220 interlocking the two guide support units 30 can be regulated so as not to move inward in the horizontal direction beyond a preset position. Accordingly, the user can set the rolled sheet R in the printer 1 more easily.

Detailed Configuration of Locking Portion and Locked Portion

A detailed configuration of the locking portion and the locked portion according to the first embodiment will be described with reference to FIG. 5.

As illustrated in FIG. 5, the locking portion 261 is formed so that distances from all contact surfaces coming into contact with the locked portion 241 to a predetermined single point are uniform. In the present embodiment, the locking portion 261 extends along a central axis oriented in the axial direction of the rotation shaft Ab and is formed in a cylindrical shape in which a cross-sectional shape when viewed from a central axial direction is a perfect circle.

The plurality of steps of the locked portion 241 are formed in a curved surface shape along a curved line in which a curved line forming a part of a spiral is offset according to a radius of the locking portion 261. Here, the spiral forming the curved line is wound from the rotation shaft Ab to the diameter outside, counterclockwise in FIG. 6, that is, in the rotation direction of the regulation gear 240 if the first rack gear 210 and the second rack gear 220 are moved inward in the width direction. The spiral is an Archimedes' screw in which a radius of the pitch circle of the regulation gear 240 and displacement of a rotation angle are consistent and is a curved line expressed by a polar equation of $r=a\theta$ (where, $a>\theta$ and $\theta\geq 0$).

In this way, the plurality of steps of the locked portion 241 follow a curved surface along the Archimedes' screw, and thus a relationship between a movement amount of the rotation regulation portion 260 and regulation positions of the two guide support units 30 can be met in accordance with a sensation of the user.

In the present embodiment, the locked portion 241 has nine steps. Each of the nine steps is formed so that a center of the locking portion 261 deviates from the adjacent steps by 9.6 degrees around the rotation shaft Ab and deviates by 2.5 mm in a radial direction of the regulation gear 240 if each of the nine steps is locked to the locking portion 261. The nine steps correspond to nine sheet widths increasing by a width of 10 mm from a minimum width of 25 mm to a maximum width of 105 mm.

A pitch circle diameter of the regulation gear 240 can be made smaller than the width of the rolled sheet R. For example, a case in which a maximum width of the rolled sheet R used in the printer 1 is set to 118 mm and movement of the two guide support units 30 within a regulation range from a minimum regulation width of 25 mm to a maximum regulation width of 105 mm is regulated by the regulation device 21 will be assumed. In this case, a movement distance of the rotation regulation portion 260 is 40 mm by an expression of 105/2-25/2, and thus the pitch circle diameter of the regulation gear 240 can be set to about 100 mm.

Second Embodiment

Figure 9:
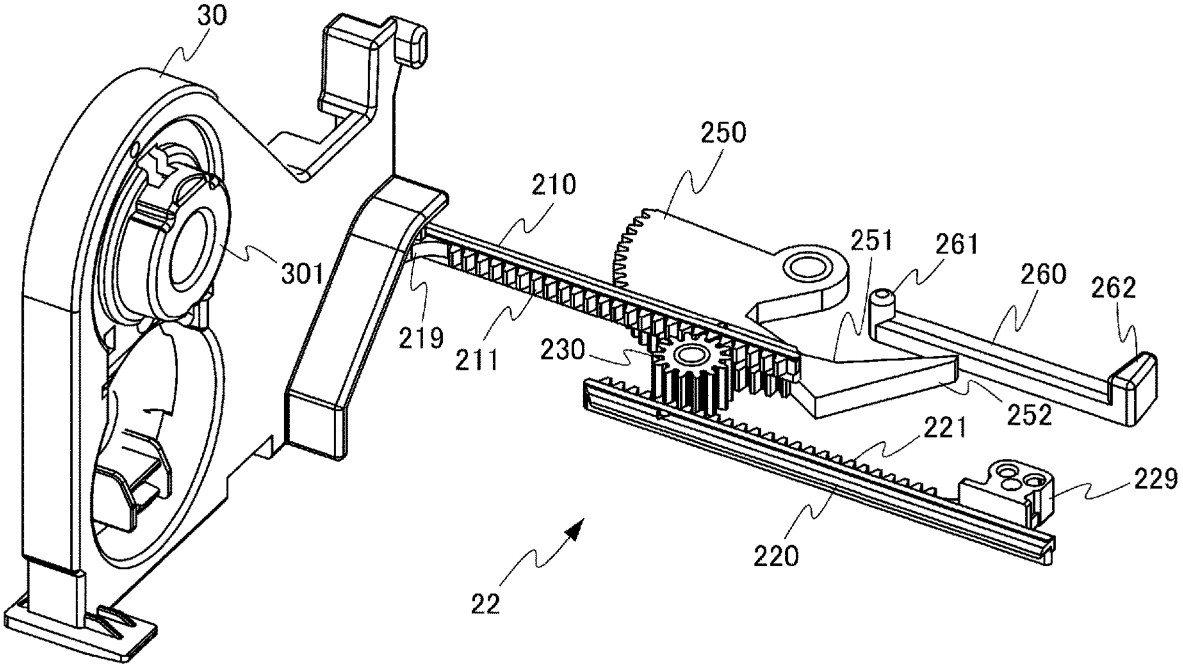
FIG. 9 is a perspective view illustrating a configuration of a regulation device according to a second embodiment.
Figure 10:
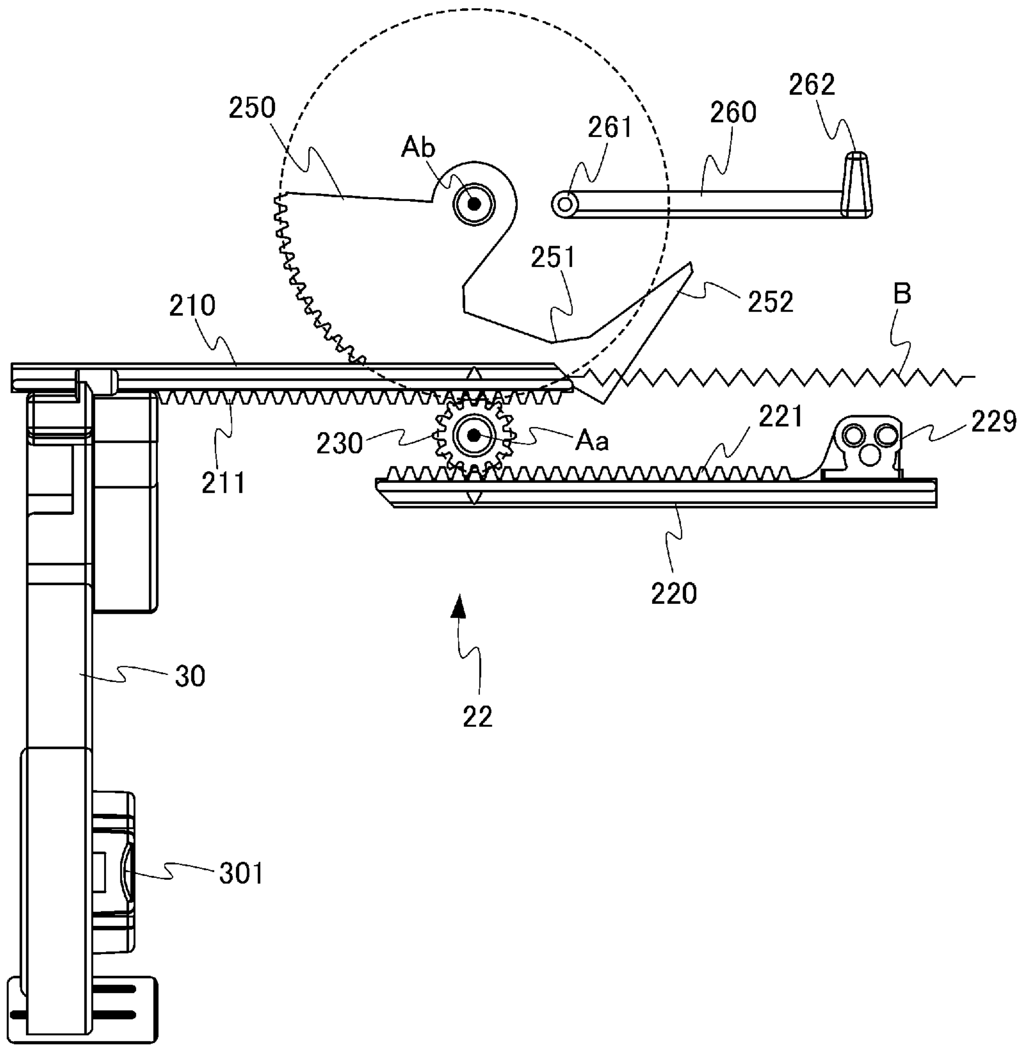
FIG. 10 is a plan view illustrating the configuration of the regulation device.
Figure 11:
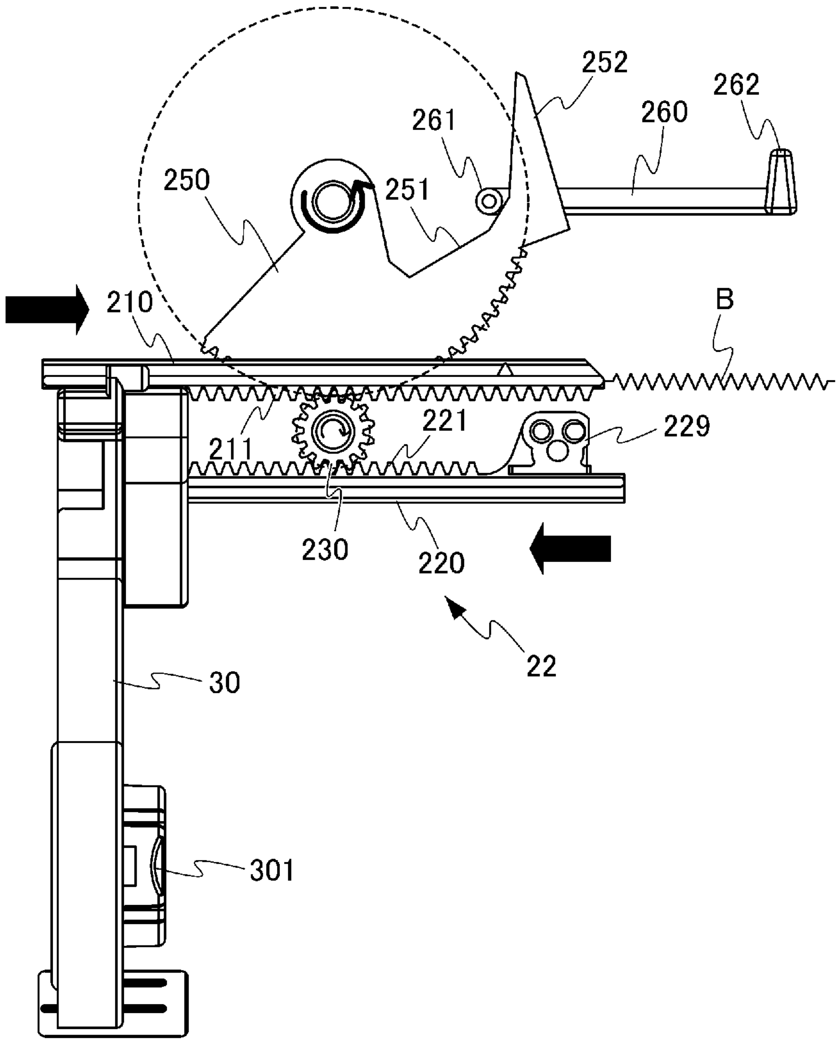
FIG. 11 is a plan view illustrating an operation of the regulation device.
Figure 12:
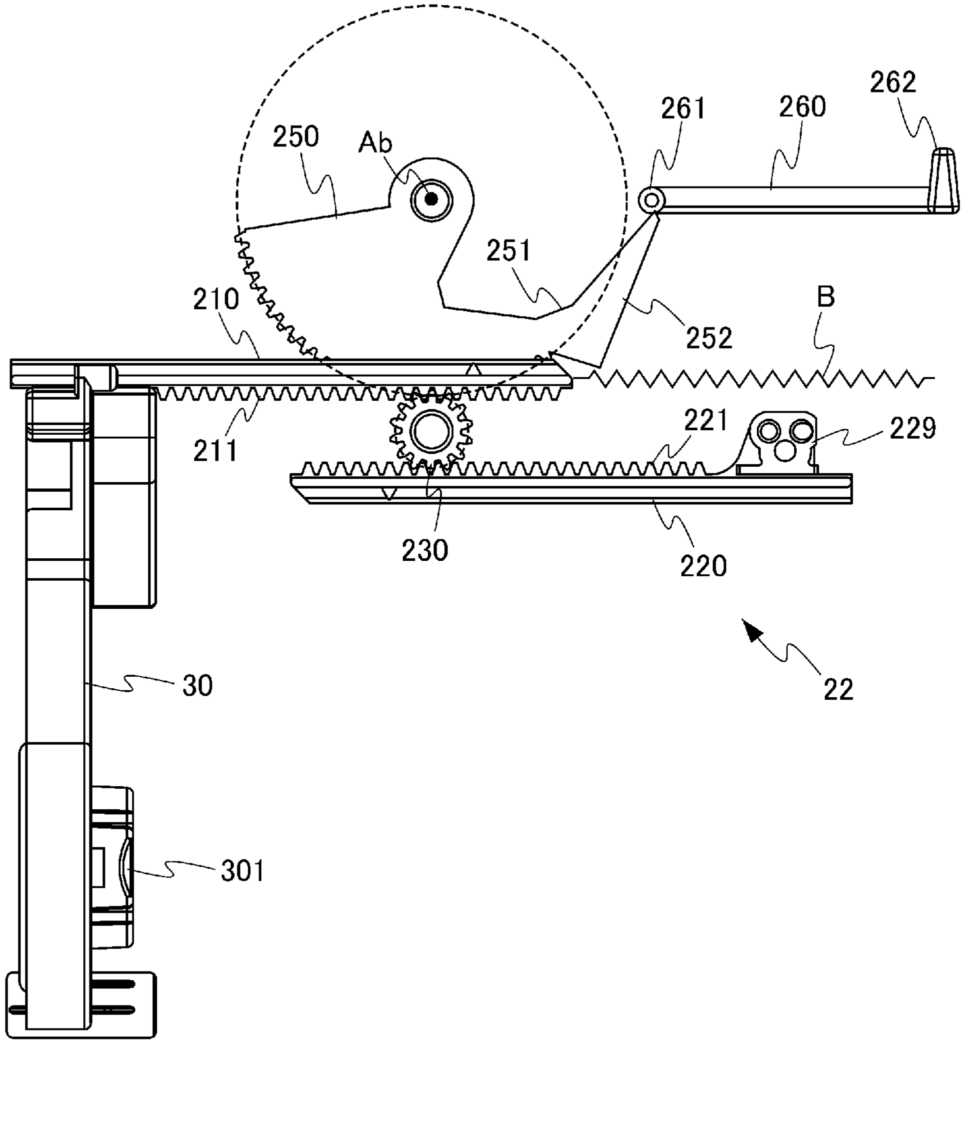
FIG. 12 is a plan view illustrating the regulation device that performs regulation with a maximum width.
Figure 13:
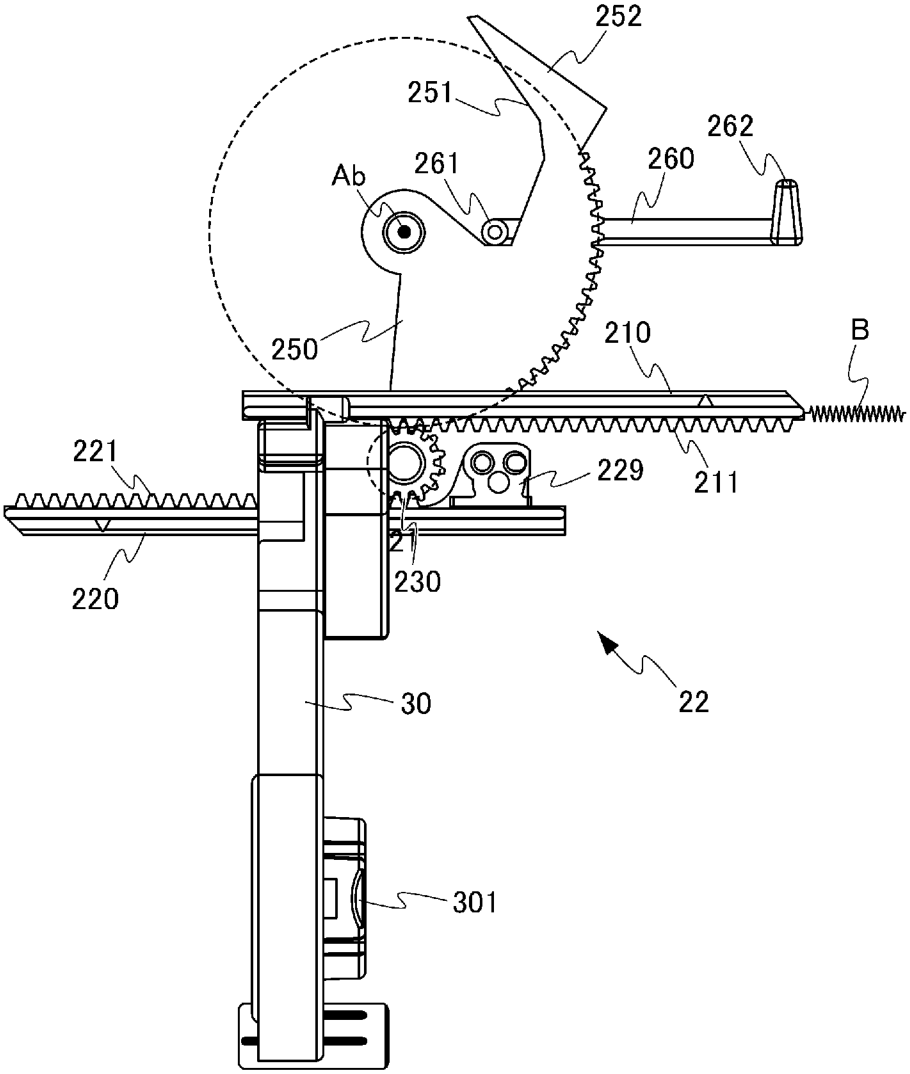
FIG. 13 is a plan view illustrating the regulation device that performs regulation with a minimum width.

A configuration and an operation of a regulation device according to a second embodiment will be described. FIGS. 9 and 10 are a perspective view and a plan view illustrating the configuration of the regulation device according to the present embodiment. FIG. 11 is a plan view illustrating the operation of the regulation device according to the present embodiment. FIGS. 12 and 13 are plan views illustrating the regulation device that performs regulation with a maximum width and a minimum width.

As illustrated in FIGS. 9 and 10, a regulation device 22 according to the present embodiment is different from the regulation device 21 according to the first embodiment in that the regulation gear 250 is included in place of the regulation gear 240.

The regulation gear 250 is different from the regulation gear 240 in that a locked portion 251 and a protrusion portion 252 are formed in place of the locked portion 241 and the protrusion portion 242. The protrusion portion 252 is the same as the protrusion portion 242 in that the protrusion portion 252 is formed to protrude to the diameter outside of the pitch circle of the regulation gear 250 and is different from the protrusion portion 242 in that the locked portion 251 is formed in place of the locked portion 241.

The locked portion 251 is formed from the inside of the pitch circle to the protrusion portion 252 located outside of the pitch circle, like the locked portion 241. The locked portion 251 is different from the locked portion 241 in that the locked portion 251 is formed in a curved surface shape along a curved line in which a curved line forming a part of a spiral is offset according to a radius of the locking portion 261. Here, the spiral forming the curved line is the Archimedes' screw as in the first embodiment and is wound from the rotation shaft Ab to the diameter outside, counterclockwise in FIG. 10, that is, in a rotation direction of the regulation gear 250 if the first rack gear 210 and the second rack gear 220 are moved inward in the width direction. The locked portion 251 may be configured by a plurality of planes lying to approximate the curved surface.

As illustrated in FIG. 11, if the first rack gear 210 is urged inward (the right in FIG. 11) in the horizontal direction by the urging member B, the regulation gear 250 engaging with the pinion gear 230 is rotated counterclockwise in FIG. 11. If the regulation gear 250 is rotated counterclockwise, the locked portion 251 of the regulation gear 250 comes into contact with the locking portion 261 of the rotation regulation portion 260 to further regulate the rotation.

In the regulation device 22, the locked portion 251 does not have a plurality of steps. Therefore, a width can be adjusted in a non-stepwise manner from a maximum width illustrated in FIG. 12 to a minimum width illustrated in FIG. 13. Accordingly, the regulation device 22 can correspond to any sheet width.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A regulation device that regulates movement in a width direction of a rolled sheet of a printer, comprising:
- a first rack gear connected to one guide support supporting the rolled sheet so that movement to a first side of the width direction is regulated, the first rack gear movable in the width direction;
- a second rack gear connected to another guide support supporting the rolled sheet so that movement to a second side of the width direction is regulated, the second rack gear movable in the width direction;
- a pinion gear engaging with the first and second rack gears; and
- a regulation gear that engages with the pinion gear to rotate and regulates the movement of the first and second rack gears by regulating rotation.

2. The regulation device according to claim 1, further comprising:
- a rotation regulation portion including a locking portion that locks the regulation gear and regulates the rotation of the regulation gear,
- wherein the locking portion is movable in a radial direction of a pitch circle of the regulation gear.

3. The regulation device according to claim 2, wherein, in the regulation gear, a locked portion has a plurality of steps with which the locking portion comes into contact and which are formed so that the regulation gear is lockable.

4. The regulation device according to claim 3, wherein the plurality of steps are positioned along a curved line forming a part of a spiral wound in a rotation direction of the regulation gear if the first and second rack gears are moved inward in the width direction from a rotation shaft of the regulation gear toward a diameter outside.

5. The regulation device according to claim 4, wherein the plurality of steps are positioned along a curved line forming a part of an Archimedes' screw.

6. The regulation device according to claim 5,
- wherein, in the locking portion, at least a surface that comes into contact with the locked portion is formed in an arc shape forming a part of a perfect circle when viewed from a central axial direction of the regulation gear, and
- the plurality of steps are positioned along a curved line forming a part of an Archimedes' screw offset by a radius distance of an arc-shaped portion of the locking portion.

7. The regulation device according to claim 2,
- wherein, in the regulation gear, a locked portion formed so that the locking portion comes into contact with the locked portion to lock the regulation gear, and
- the locked portion is formed in a curved surface shape along a curved line forming a part of a spiral wound in a rotation direction of the regulation gear if the first and second rack gears are moved inward in the width direction from a rotation shaft of the regulation gear toward a diameter outside.

8. The regulation device according to claim 4,
- wherein the regulation gear is formed in a substantial fan shape in which a plurality of teeth are positioned in an arc portion when viewed from a central axial direction of the regulation gear and includes a protrusion portion protruding to a diameter outside of a pitch circle of the regulation gear, and
- the plurality of steps are positioned from an inside of the pitch circle to the protrusion portion.

9. The regulation device according to claim 1, further comprising:
- an urging member that urges the first rack gear to the second side in the width direction.

10. The regulation device according to claim 1, wherein the first rack gear and the second rack gear are disposed so that connection portions thereof are located outward in a horizontal direction, respectively.

11. A printer, comprising:
- a print head; and
- a regulation device that regulates movement in a width direction of a rolled sheet, the regulation device comprising:
  - a first rack gear connected to one guide support supporting the rolled sheet so that movement to a first side of the width direction is regulated, the first rack gear movable in the width direction;
  - a second rack gear connected to another guide support supporting the rolled sheet so that movement to a second side of the width direction is regulated, the second rack gear movable in the width direction;
  - a pinion gear engaging with the first and second rack gears; and
  - a regulation gear that engages with the pinion gear to rotate and regulates the movement of the first and second rack gears by regulating rotation.

12. The printer according to claim 11, further comprising:
- a rotation regulation portion including a locking portion that locks the regulation gear and regulates the rotation of the regulation gear,
- wherein the locking portion is movable in a radial direction of a pitch circle of the regulation gear.

13. The printer according to claim 12, wherein, in the regulation gear, a locked portion has a plurality of steps with which the locking portion comes into contact and which are formed so that the regulation gear is lockable.

14. The printer according to claim 13, wherein the plurality of steps are positioned along a curved line forming a part of a spiral wound in a rotation direction of the regulation gear if the first and second rack gears are moved inward in the width direction from a rotation shaft of the regulation gear toward a diameter outside.

15. The printer according to claim 14, wherein the plurality of steps are positioned along a curved line forming a part of an Archimedes' screw.

16. The printer according to claim 15, wherein, in the locking portion, at least a surface that comes into contact with the locked portion is formed in an arc shape forming a part of a perfect circle when viewed from a central axial direction of the regulation gear, and the plurality of steps are positioned along a curved line forming a part of an Archimedes' screw offset by a radius distance of an arc-shaped portion of the locking portion.

17. The printer according to claim 12, wherein, in the regulation gear, a locked portion formed so that the locking portion comes into contact with the locked portion to lock the regulation gear, and the locked portion is formed in a curved surface shape along a curved line forming a part of a spiral wound in a rotation direction of the regulation gear if the first and second rack gears are moved inward in the width direction from a rotation shaft of the regulation gear toward a diameter outside.

18. The printer according to claim 14, wherein the regulation gear is formed in a substantial fan shape in which a plurality of teeth are positioned in an arc portion when viewed from a central axial direction of the regulation gear and includes a protrusion portion protruding to a diameter outside of a pitch circle of the regulation gear, and the plurality of steps are positioned from an inside of the pitch circle to the protrusion portion.

19. The printer according to claim 11, further comprising:

an urging member that urges the first rack gear to the second side in the width direction.

20. The printer according to claim 11, wherein the first rack gear and the second rack gear are disposed so that connection portions thereof are located outward in a horizontal direction, respectively.

* * * * *